(12) United States Patent
Telakowski

(10) Patent No.: US 7,732,953 B2
(45) Date of Patent: Jun. 8, 2010

(54) ELECTRIC MOTOR COOLING

(75) Inventor: Robert Telakowski, Windsor Locks, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 20 days.

(21) Appl. No.: 11/761,514

(22) Filed: Jun. 12, 2007

(65) Prior Publication Data

US 2008/0309175 A1 Dec. 18, 2008

(51) Int. Cl.
*H02K 9/00* (2006.01)
(52) U.S. Cl. .............................. 310/59; 310/52; 310/54; 310/58; 310/60 A; 310/60 R; 310/61; 310/62; 310/156.01; 310/156.12; 310/156.28
(58) Field of Classification Search ............... 310/60 A, 310/156, 59, 52, 58, 156.12, 156.01, 156.28, 310/61, 54, 60 R, 62; *H02K 9/00*
See application file for complete search history.

(56) References Cited

U.S. PATENT DOCUMENTS

| | | | | | |
|---|---|---|---|---|---|
| 2,900,538 | A | * | 8/1959 | Tudge | 310/59 |
| 3,110,827 | A | * | 11/1963 | Baudry | 310/55 |
| 3,377,811 | A | * | 4/1968 | Siegrist et al. | 62/608 |
| 4,301,375 | A | * | 11/1981 | Anderson | 290/1 R |
| 4,922,146 | A | * | 5/1990 | Vanduyn | 310/59 |
| 5,652,469 | A | * | 7/1997 | Boardman et al. | 310/58 |
| 6,455,964 | B1 | * | 9/2002 | Nims | 310/90 |
| 6,703,729 | B2 | * | 3/2004 | Weeber et al. | 310/52 |
| 6,727,609 | B2 | * | 4/2004 | Johnsen | 310/52 |
| 6,882,068 | B2 | * | 4/2005 | Weeber et al. | 310/59 |
| 7,462,964 | B2 | * | 12/2008 | Nagayama et al. | 310/58 |
| 2002/0140308 | A1 | * | 10/2002 | Inayama et al. | 310/156.47 |
| 2003/0038553 | A1 | * | 2/2003 | Andres et al. | 310/90.5 |
| 2004/0032172 | A1 | * | 2/2004 | Tong | 310/58 |
| 2005/0116555 | A1 | * | 6/2005 | Rowe et al. | 310/58 |
| 2006/0051222 | A1 | * | 3/2006 | Lee et al. | 417/423.14 |
| 2006/0061221 | A1 | * | 3/2006 | McAuliffe et al. | 310/59 |

(Continued)

*Primary Examiner*—Quyen Leung
*Assistant Examiner*—John K Kim
(74) *Attorney, Agent, or Firm*—Carlson, Gaskey & Olds, P.C.

(57) ABSTRACT

An electric motor cooling system is provided that includes a housing and first and second cooling sources that are different from one another respectively to provide first and second cooling flows. A stator is mounted in the housing and receives the first cooling flow. A rotor is rotatable relative to the stator and receives the second cooling flow. In the examples, the housing supports a journal bearing upon which the rotor is supported, and the second cooling flows through the journal bearing. The first cooling flow is provided by a low pressure source such as ram air, and the second cooling flow is provided by high pressure source such as bleed air, for example. A circumferential gap is provided between the rotor and stator. In one example, a seal is arranged between the housing and a stator for providing a cavity in fluid communication with the journal bearing and the gap. The cooling flow from the journal bearing passes through the cavity and into the gap for cooling the rotor. In another example, the rotor includes circumferentially spaced magnets providing spaces. The spaces are arranged interiorly of an exterior surface of the rotor. A passage is in communication with the spaces and journal bearing. The second cooling flow from the journal bearing passes through the passage and into the spaces for cooling the rotor.

13 Claims, 3 Drawing Sheets

U.S. PATENT DOCUMENTS

2006/0061222 A1* 3/2006 McAuliffe et al. ........ 310/60 R
2006/0290218 A1* 12/2006 Shafer et al. ........... 310/156.28
2007/0052313 A1* 3/2007 Takahashi et al. ...... 310/156.53

* cited by examiner

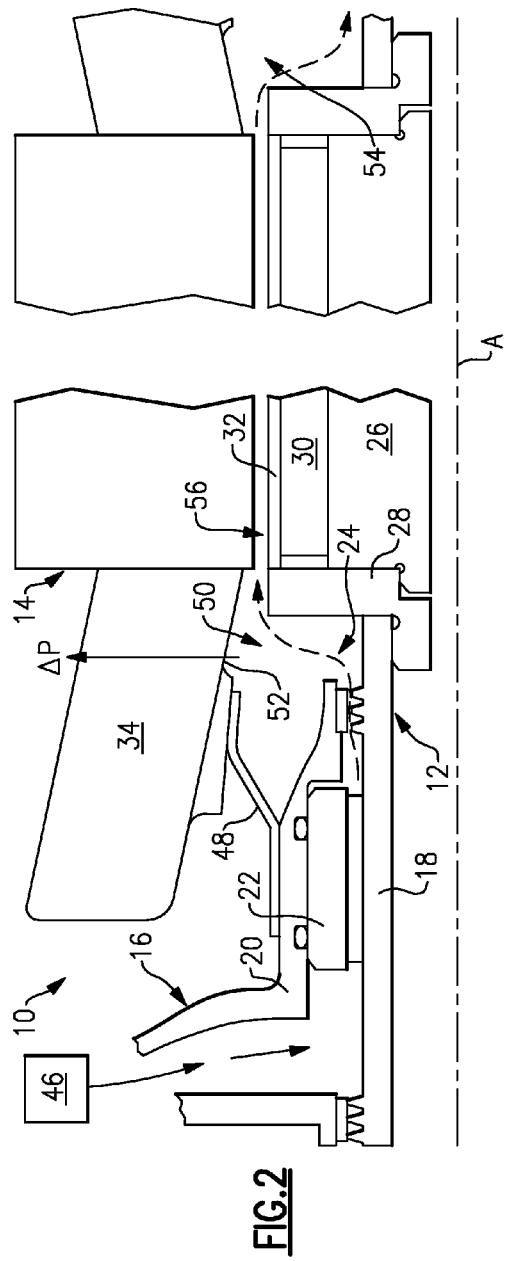
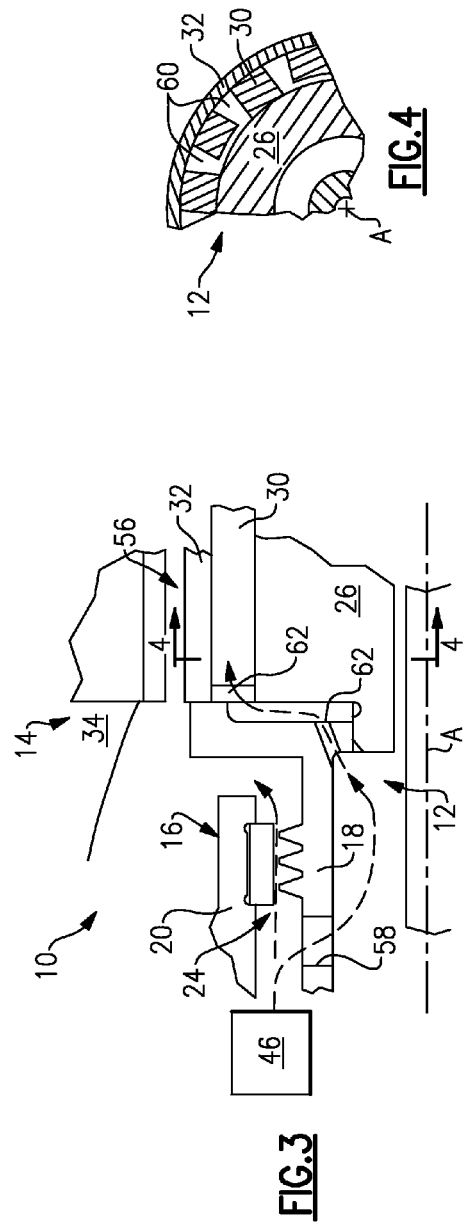
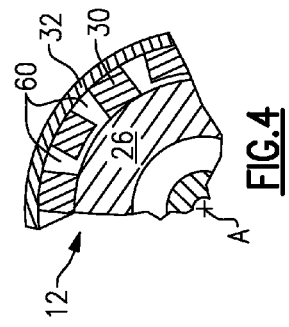

ELECTRIC MOTOR COOLING

BACKGROUND OF THE INVENTION

This invention relates to an apparatus of cooling an electric motor that is used, for example, in aircraft applications.

In many motor applications significant cooling is required to maintain the motor within acceptable temperatures. An electric motor includes a fixed stator that rotationally drives a rotor. The stator is typically cooled by airflow through slots located at an outer diameter of the stator. The motor rotor is typically cooled by providing air to a gap, which separates the stator and rotor. Typically the air provided to the stator and rotor originates from the same source. Often high pressure cooled bleed air is used as the motor cooling source, which reduces engine performance.

The size of the gap between the stator and rotor affects the motor performance. The gap is minimized to provide better performance and efficiency for the motor. However, minimizing the gap restricts the flow of cooling air, which makes cooling the rotor more difficult. At high rotational speeds, the viscous forces between the stator and rotor create a high impedance at the gap. As a result, high pressure air is required to force the cooling flow through the gap. The cooling slots at the stator outer diameter, however, typically do not require this high pressure to force the cooling flow through the slots. As a result, the overall efficiency of the cooling arrangement suffers from providing unneeded high pressure air to the stator.

What is needed is a cooling arrangement that does not negatively impact the motor performance and efficiency nor overly burdens the cooling source.

SUMMARY OF THE INVENTION

An electric motor cooling system is provided that includes a housing and first and second cooling sources that are different from one another respectively provide first and second cooling flows. A stator is mounted in the housing and receives the first cooling flow. A rotor is rotatable relative to the stator and receives the second cooling flow. In the examples, the housing supports a journal bearing upon which the rotor is supported, and the second cooling flows through the journal bearing. The first cooling flow is provided by a low pressure source such as ram air, and the second cooling flow is provided by high pressure source such as bleed air.

A circumferential gap is provided between the rotor and stator. In one example, a seal is arranged between the housing and a stator for providing a cavity in fluid communication with the journal bearing and the gap. The cooling flow from the journal bearing passes through the cavity and into the gap for cooling the rotor.

In another example, the rotor includes circumferentially spaced magnets providing spaces. The spaces are arranged interiorly of an exterior surface of the rotor. A passage is in communication with the spaces and journal bearing. The second cooling flow from the journal bearing passes through the passage and into the spaces between the magnets for cooling the rotor.

Accordingly, the example cooling arrangements provide separate cooling flow for the stator and rotor, which provide more efficient use of cooling flow from the cooling sources without compromising the efficiency of the motor by increasing the gap. The quantity, pressure and temperature of the cooling flows to the stator and rotor can be independently controlled.

These and other features of the present invention can be best understood from the following specification and drawings, the following of which is a brief description.

BRIEF DESCRIPTION OF THE DRAWINGS

FIG. 2 is an enlarged partial cross-sectional view illustrating one example of cooling flow through a gap between the stator and a rotor that is separate from the cooling flow passing through the slots in the stator.

FIG. 3 is an enlarged partial cross-sectional view of another example cooling flow through the rotor gap being from a separate source that that flowing through the stator slots.

FIG. 4 is a cross-sectional view taken along line 4-4 in FIG. 3.

DETAILED DESCRIPTION OF THE PREFERRED EMBODIMENT

Figure 1:
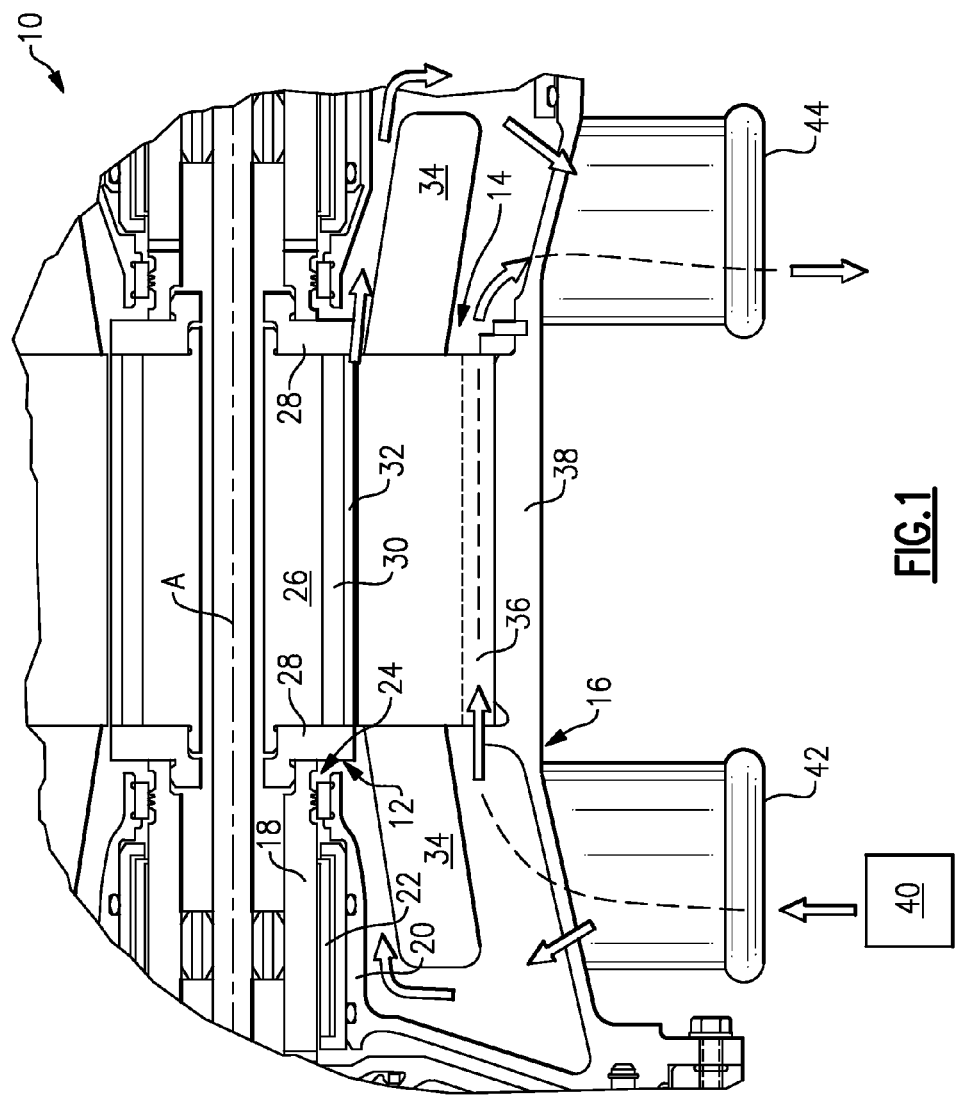
FIG. 1 is a partial cross-sectional view of an example motor depicting a first cooling flow through a stator.

An electric motor 10 is shown in FIG. 1. The electric motor 10 can be used to drive an aircraft compressor, for example. The motor 10 includes a stator 14 mounted in a housing 16. A rotor 12 rotates about an axis A relative to the stator 14, as is known art.

The rotor 12 includes a shaft 18 that is supported by a journal bearing 22 mounted in a first housing portion 20. A seal assembly 24 is arranged between the shaft 18 and the first housing portion 20. In the example shown, the seal assembly 24 is a knife edge seal arrangement. The rotor 12 includes a hub 26 retained between end caps 28 that are supported by the shaft 18. Magnets 30 are arranged circumferentially about the hub 26 and encased by a liner 32.

The stator 14 is provided by windings that include end turns 34. In the example, the stator 14 includes axially extending slots 36 that provide cooling channels arranged between the stator 14 and a second housing portion 38. A first cooling source 40, such as ram air, provides a low pressure cooling source corresponding to a first cooling flow. The first cooling flow flows through an inlet 42 into the slots 36 and exits an outlet 44. The first cooling flow and first cooling source 40 are exemplary.

An example rotor cooling arrangement is shown in FIG. 2. A second cooling source 46, such as cooled bleed air from a turbine engine, provides a higher pressure cooling source relative to the first cooling source 40. The second cooling source 46 provides a second cooling flow used to cool the journal bearings 22. In the example shown, a seal 48 is arranged between the first housing portion 20 and the end turns 34 of the stator 14. The seal 48 can be a leaf-type seal, an O-ring or similar device, for example. The seal 48 provides a cavity 50 at a first side 52 of the end turns 34. A second side 54 opposite the first side 52 is at the lower pressure provided by the first cooling source 40. The pressure differential across the end turns 34 causes air to flow from the cavity 50 through the gap 56 to the second side 54.

A circumferential gap 56 is provided between the rotor 12 and stator 14. The second cooling flow flows through the journal bearing 22 and leaks past the seal assembly 24, as is typical, entering the cavity 50. Flow from the enclosed cavity 50 enters the gap 56 to cool the rotor. In this manner, the needed high pressure cooling flow can be provided to the gap 56 to cool the rotor while the stator 14 is simply provided low pressure cooling flow, as illustrated in FIG. 1. As a result, less bleed air is used, which improves the efficiency of the source.

Another example rotor cooling arrangement is illustrated in FIGS. 3 and 4. Similar to the arrangement shown in FIG. 2, the second cooling flow is provided by the second cooling source 46 and flows through the journal bearing 22, which is not shown in FIG. 3. An opening 58 is provided upstream from the seal assembly 24 to permit the second cooling flow to flow through a hollow portion of the shaft 18. The hub 26 includes magnets 30 circumferentially spaced about the hub 26. In the example, axially extending spaces 60 are provided between the magnets 30. The liner 32 is typically used to encase the magnets 30, which provides the spaces 60 that are separated from the gap 56. The liner 32 provides an external surface of the rotor 12 facing the gap 56. A passage 62 provided by the shaft 18 in the example shown permits the second cooling flow to flow through the spaces 60 between the magnets 30 to cool the rotor 12. The second cooling flow may exit the opposite side of the rotor 12 through structure similar to the structure through which the second cooling flow entered. Some low pressure cooling flow used for the slots 36 of the stator 14 may also be provided to the gap 56. This provides redundancy if the high pressure cooling source is disturbed or comprised.

Figure 5:
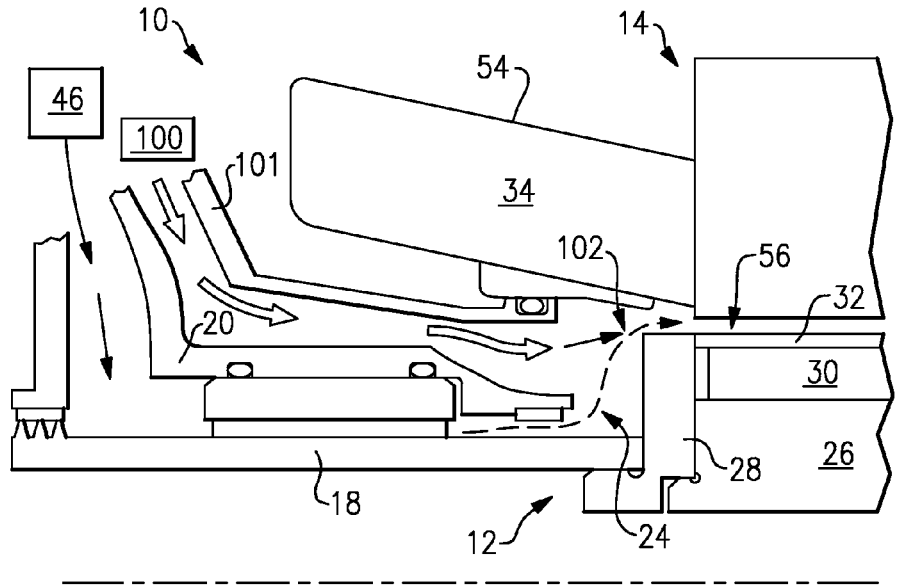
FIG. 5 is similar to FIG. 2 and includes a third cooling flow.
Figure 6:
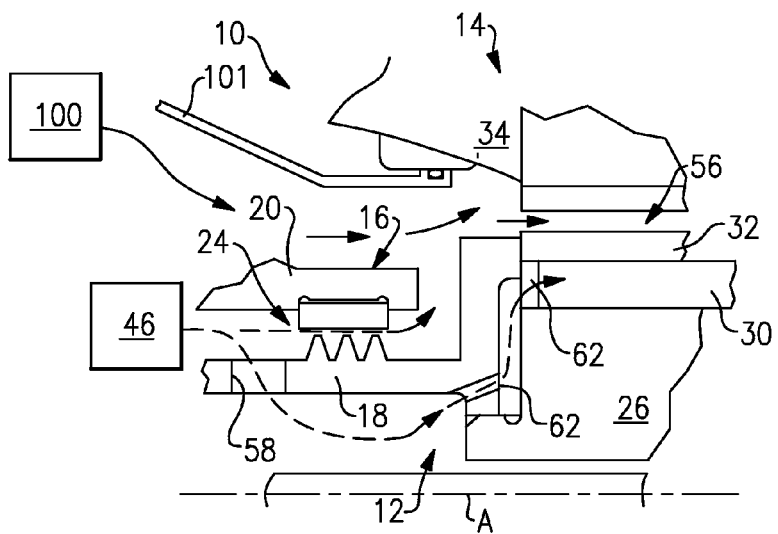
FIG. 6 is similar to FIG. 3 and includes a third cooling flow.

A barrier plate 101 separates the second and third cooling flows upstream from the rotor 12 and guides the third cooling flow to the gap 56. Depending on the magnitude of flows and the pressures, throttling can be used to control the flow from the sources 46, 100. In one example in which the second and third cooling sources 46, 100 are the same, no throttling is needed. A third cooling flow is shown in FIGS. 5 and 6. In the example, the third cooling flow is provided by a third cooling source 100, which can be the same as or different than the second cooling source 46. The third cooling flow provides supplemental cooling to the second cooling flow, to which it merges at point 102 in the example shown in FIG. 5.

Although an example embodiment of this invention has been disclosed, a worker of ordinary skill in this art would recognize that certain modifications would come within the scope of this invention. For that reason, the following claims should be studied to determine the true scope and content of this invention.

What is claimed is:

1. An electric motor cooling system comprising:
   first and second cooling paths respectively configured to receive first and second cooling flows having different pressures than one another that are respectively provided by first and second cooling sources that are different than one another;
   a stator mounted in a housing and configured to receive the first cooling flow;
   a rotor rotatable relative to the stator and configured to receive the second cooling flow, wherein the rotor is supported for rotation relative to the stator by a journal bearing mounted in the housing and arranged in the second cooling path and configured to provide the second cooling flow through the journal bearing; and
   a third cooling source providing a third cooling flow, the third cooling flow separate from the second cooling flow upstream from the rotor and merging with the second cooling flow near the rotor.

2. The electric motor cooling system according to claim 1, wherein the second cooling source is bleed air from a turbine engine.

3. The electric motor cooling system according to claim 1, wherein the first cooling source is at a lower pressure than the second cooling source resulting in a differential pressure.

4. The electric motor cooling system according to claim 3, wherein the differential pressure moves the second cooling flow, a circumferential gap arranged between the stator and the rotor.

5. The electric motor cooling system according to claim 3, wherein a seal is arranged between the housing and the stator.

6. The electric motor cooling system according to claim 3, wherein the first cooling source is a ram air.

7. The electric motor cooling system according to claim 1, wherein the rotor includes magnets that provide spaces, the spaces receiving the second cooling flow.

8. The electric motor cooling system according to claim 1, wherein the first cooling flow is provided to slots in the stator.

9. The electric motor cooling system according to claim 1, wherein the second and third cooling sources are the same.

10. The electric motor cooling system according to claim 1, wherein a barrier plate separates the second and third cooling flows upstream from the rotor.

11. An electric motor cooling system comprising:
    a housing supporting a stator;
    a rotor supported for rotation relative the stator, and a circumferential gap provided between the rotor and stator;
    a seal arranged between the housing and the stator providing a cavity in fluid communication with the gap, the cavity configured to receive a cooling flow from a cooling source with the cooling flow passing through the cavity and into the gap for cooling the rotor;
    wherein the stator includes axially spaced first and second sides including opposing end turns, the cavity arranged on the first side and configured to provide a differential pressure across the first and second sides for moving the cooling flow from the cavity to the second side; and
    a seal assembly arranged between the housing and the rotor and arranged upstream from the cavity, the seal assembly configured to receive the cooling flow flowing past the journal bearing.

12. The electric motor cooling system according to claim 11, wherein a journal bearing supports the rotor relative to the housing, the cavity arranged between the journal bearing and the gap, and the journal bearing configured to receive the cooling flow and provide the cooling flow to the cavity.

13. The electric motor cooling system according to claim 11, wherein the cooling source is configured to provide a high pressure air and the second side is configured to provide a lower pressure air than the high pressure air.

* * * * *